(12) United States Patent
Becker et al.

(10) Patent No.: US 9,806,327 B2
(45) Date of Patent: Oct. 31, 2017

(54) METHOD FOR THE PRODUCTION OF A POROUS ELEMENT, AND CELL OF A RECHARGEABLE OXIDE BATTERY

(75) Inventors: Ines Becker, Nürnberg (DE); Horst Greiner, Forchheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 856 days.

(21) Appl. No.: 14/113,918

(22) PCT Filed: Apr. 3, 2012

(86) PCT No.: PCT/EP2012/056051
§ 371 (c)(1),
(2), (4) Date: Dec. 19, 2013

(87) PCT Pub. No.: WO2012/146465
PCT Pub. Date: Nov. 1, 2012

(65) Prior Publication Data
US 2014/0113201 A1 Apr. 24, 2014

(30) Foreign Application Priority Data
Apr. 27, 2011 (DE) .................. 10 2011 017 594

(51) Int. Cl.
*H01M 4/04* (2006.01)
*B22F 3/11* (2006.01)
(Continued)

(52) U.S. Cl.
CPC ............ *H01M 4/0433* (2013.01); *B22F 3/11* (2013.01); *B82Y 30/00* (2013.01); *C04B 35/01* (2013.01); *C04B 35/26* (2013.01); *C04B 35/6455* (2013.01); *C04B 38/06* (2013.01); *C22C 1/051* (2013.01); *C22C 1/056* (2013.01);
(Continued)

(58) Field of Classification Search
CPC ........ B22F 3/11; H01M 4/0433; C04B 35/01; C04B 35/26
See application file for complete search history.

(56) References Cited

U.S. PATENT DOCUMENTS

| 4,030,891 A | 6/1977 | Alexandrov |
| 2002/0037234 A1 | 3/2002 | Abrams |

(Continued)

FOREIGN PATENT DOCUMENTS

| EP | 0388558 A2 | 9/1990 |
| WO | WO 2006066973 A2 | 6/2006 |

OTHER PUBLICATIONS

Kee, R J. et al Solid-oxide fuel cells with hydrocarbon fuels; Kee et al., Proceedings of teh Combustion Institute 30, 2005, 2379-2404.

*Primary Examiner* — Jonathan Johnson
*Assistant Examiner* — Christopher Kessler

(57) ABSTRACT

A method for producing a porous element is presented. A powdery metal-ceramic composite material is produced. The composite material has a metal matrix and a ceramic portion amounting to less than 25 percent by volume. The metal matrix is at least partially oxidized to obtain a metal oxide. The metal-ceramic composite material is grinded and mixed with powdery ceramic supporting particles to obtain a metal-ceramic/ceramic mixture. The metal-ceramic/ceramic mixture is shaped into the porous element. The porous element can be used as an energy storage medium in a battery.

9 Claims, 4 Drawing Sheets

(51) Int. Cl.
   *C04B 35/01* (2006.01)
   *C04B 35/26* (2006.01)
   *C04B 35/645* (2006.01)
   *C04B 38/06* (2006.01)
   *C22C 1/05* (2006.01)
   *C22C 1/10* (2006.01)
   *C22C 29/12* (2006.01)
   *C22C 33/02* (2006.01)
   *H01M 4/38* (2006.01)
   *H01M 4/66* (2006.01)
   *H01M 4/70* (2006.01)
   *H01M 12/08* (2006.01)
   *B82Y 30/00* (2011.01)
   *C04B 111/00* (2006.01)

(52) U.S. Cl.
   CPC ............ *C22C 1/1078* (2013.01); *C22C 29/12* (2013.01); *C22C 33/0228* (2013.01); *H01M 4/38* (2013.01); *H01M 4/664* (2013.01); *H01M 4/70* (2013.01); *H01M 12/08* (2013.01); *C04B 2111/00853* (2013.01); *C04B 2235/3224* (2013.01); *C04B 2235/3225* (2013.01); *C04B 2235/3246* (2013.01); *C04B 2235/405* (2013.01); *C04B 2235/5436* (2013.01); *C04B 2235/5454* (2013.01); *C04B 2235/5481* (2013.01); *H01M 2300/0074* (2013.01); *Y02E 60/128* (2013.01)

(56) References Cited

U.S. PATENT DOCUMENTS

2003/0165726 A1   9/2003   Emad
2006/0125157 A1   6/2006   Coors

METHOD FOR THE PRODUCTION OF A POROUS ELEMENT, AND CELL OF A RECHARGEABLE OXIDE BATTERY

CROSS REFERENCE TO RELATED APPLICATIONS

This application is the US National Stage of International Application No. PCT/EP2012/056051 filed Apr. 3, 2012 and claims benefit thereof, the entire content of which is hereby incorporated herein by reference. The International Application claims priority to the German application No. 10 2011 017 594.6 filed Apr. 27, 2011, the entire contents of which is hereby incorporated herein by reference.

BACKGROUND OF INVENTION

For the storage of excess energy which is generated, for example, during the operation of renewable energy sources and which cannot be taken up by the power system, rechargeable oxide batteries (ROB) offer a good possibility for storing relatively large quantities of energy.

What the ROBs have in common is that an energy storage medium is needed in order to fulfill a plurality of physical parameters. Said parameters include, in particular, a large number of charging and discharging cycles, wherein it has been found that the porosity of the storage medium, in particular, as well as the mechanical stability thereof are essential criteria. At present, loose powders or slicks or pre-sintered moldings made of a metal oxide are used as storage media. Although, using said storage media, it is possible to achieve a high level of loading of the cells with the energy storage medium, the disadvantage of all previously known embodiments of the storage medium lies, in particular, in the fact that over a large number of charging and discharging cycles, the porosity decreases because, due to the temperature loading, the metal particles become sintered or fused together. As the number of cycles increases, an ageing process therefore occurs in the energy storage unit, which forces an early replacement of the unit.

SUMMARY OF INVENTION

It is therefore an object of the invention to provide a method for the production of a porous element which serves as a storage medium for an energy storage unit. In any event, the object of the invention lies in providing an energy storage unit or a "cell" of a battery of this type.

The achievement of this aim lies in a method for producing a porous element, in the use of a porous element and in a cell of a re-chargeable oxide battery according to the independent claims.

The method according to the first independent claim for producing a porous element comprises the following steps:

Firstly a powdered metal-ceramic composite material is provided which comprises both a metal matrix and a ceramic portion, wherein the volume proportion of the ceramic portion is preferably less than 25%. Said metal-ceramic composite material is then at least partially oxidized so that the metal matrix is converted to a metal oxide. According to strict terminological positions, the metal-ceramic composite material treated in this way should be designated a ceramic composite material because, in an ideal case, the whole of the metal matrix is oxidized. Since, on proper use, as will be described below, this functionally operating metal-ceramic composite material is cyclically oxidized and reduced, said material is designated below as a metal-ceramic composite material and, if it is important for the description and to aid comprehension, the adjective oxidized is explicitly used so that it is clear that, in this method step, it is the oxidized metal-ceramic composite material that is involved.

In a further method step, the oxidized metal-ceramic composite material may possibly be ground and thereafter mixed with a powdered ceramic material, said powdered ceramic material being designated below as supporting particles because this designation describes the functioning of the particles. The mixture of the oxidized metal-ceramic composite material and the ceramic supporting particles thus obtained is designated a metal-ceramic/ceramic mixture. This mixture is passed to a shaping tool for shaping and the porous element is made therefrom.

Compared with the prior art in which conventionally a pure metal is pressed and a porous element is made therefrom, the inventive porous element differs as an energy store for an ROB, in particular, in two features. Firstly, the metal which serves as the actual energy store by virtue of being cyclically oxidized and reduced is reinforced with a ceramic portion to form an ODS (oxide dispersion-strengthened alloy). Said ODS metal-ceramic composite material has a higher degree of form stability than is the case with a conventional metal particle. An ODS metal-ceramic composite material of this type is therefore able mechanically to withstand many oxidation and reduction cycles without suffering any great loss of strength. Furthermore, the density difference which exists between the metal and the oxide thereof and which arises cyclically during the oxidation and reduction processes is compensated for to a significant extent by the reinforcing ceramic portion.

A second significant point with regard to the inventive porous element which is produced in accordance with the inventive method is that the particles of the metal-ceramic composite material do not lie directly on one another, but are supported by ceramic supporting particles. By means of the supporting particles, sintering and melting of the particles of the metal-ceramic composite material is also prevented since a uniform porosity of the porous element can always be maintained over a large number of charging and discharging cycles.

In an advantageous embodiment of the invention, the metal matrix of the metal-ceramic composite material is iron or an iron alloy. Furthermore, the ceramic portion consists, in particular, of an oxide ceramic, for example, in a highly advantageous embodiment, of a zirconium ceramic material which, in turn, can be strengthened, in particular, by doping with yttrium or scandium.

In order to produce the powdered metal-ceramic composite material, there are various possible and productive methods and particularly advantageous is a method wherein the metal matrix, for example, the iron powder, and the ceramic portion, for example also a zirconium oxide ceramic which can possibly be doped with scandium or yttrium, are alloyed with one another through the action of mechanical energy. For this purpose, attritors or oscillating disc mills are particularly suitable devices by means of which, through the action of mechanical energy, the metal particles are microscopically reshaped multiple times and the more brittle ceramic particles which make up the ceramic portion are kneaded into the metal matrix. The expression alloying is understood in this context to mean that microscopic particles of the ceramic portion are enclosed by the metal matrix. At the border surfaces, an exchange of the atoms of the individual material components can take place, although this does not necessarily mean that this process involves chemical bonding between the materials. Rather, the ceramic portion of the metal-ceramic composite material is present finely dispersed in the larger metallic matrix grains.

In a preferred embodiment of the invention, the ceramic supporting particles which are mixed with the metal-ceramic composite material are larger than the particles of the metal-ceramic composite material, based always on a mean particle size derived from within a particle size distribution.

In order to achieve a specific porosity in the porous element, it may also be suitable to add an additional filler material which will possibly be removed later from the porous element by oxidation, leaving behind pores in a specific manner.

The particle size of the ceramic portion in the metal-ceramic composite material is preferably in the range of 10 nm to 50 nm. Particularly small particles have proved to be particularly useful for reinforcing the metal matrix. Since these particles are technically difficult and possibly not economical to produce, it may also be suitable for the particle size to be in the range of 20 nm to 200 nm or in the range of 20 nm to 500 nm. In these stipulations of particle sizes, a broad particle size distribution is always resorted to, such that in the end regions of such a distribution, there is also a significant number of particles so that where such particle sizes are given, it is always taken that 80% of the particles are in the desired spectrum of the particle size distribution.

These distribution assumptions apply also for the particle size distribution of the metal-ceramic composite material, said particles preferably being a factor of 10 to 100 larger than the ceramic portion, meaning that in an advantageous embodiment, at least 80% of the particles of the metal-ceramic composite material have a size of 1 µm and 50 µm.

The ceramic supporting particles should preferably be larger by approximately an order of magnitude than the particles of the metal-ceramic composite material, and it is here suitable that a particle distribution of the 80% of the ceramic supporting particles preferably lies in the range of 10 µm to 100 µm.

A further object of the invention is the use of a porous element which is produced according to a method of the preceding claims as an energy storage medium in a re-chargeable oxide battery (ROB).

A yet further object of the invention is a cell of a re-chargeable oxide battery which comprises a positive electrode, a solid-state electrolyte and at least one base plate for a negative electrode. The base plate for a negative electrode has depressions in which a porous element is arranged. The porous element is configured so as to comprise, firstly, particles of a metal-ceramic composite material having a metal matrix and a ceramic portion and, secondly, ceramic supporting particles.

The ceramic supporting particles act, as described in relation to the method according to the invention, in such a manner that the particles of the metal-ceramic composite material do not melt together so that a pre-determined porosity is maintained in the porous element even after a large number of charging and discharging cycles of the cell.

BRIEF DESCRIPTION OF DRAWINGS

Further embodiments and further features of the invention are disclosed in greater detail with reference to the figures below. These relate solely to exemplary embodiments of the invention, without restricting the scope of protection of the independent claims.

In the drawings.

DETAILED DESCRIPTION OF INVENTION

Figure 1:
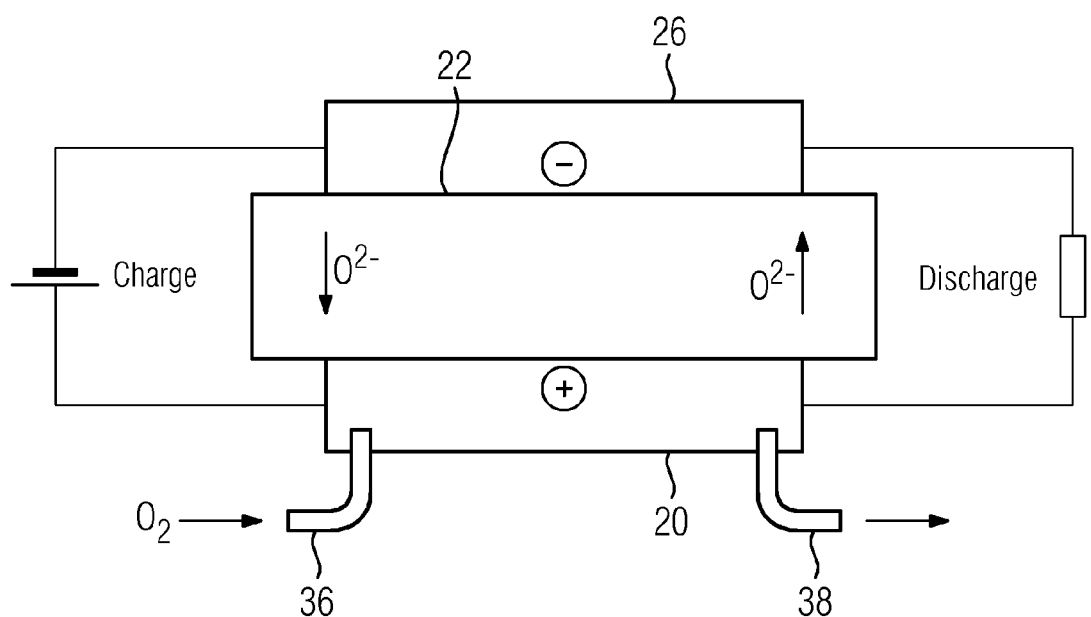
FIG. 1 is a schematic representation of a cell for an ROB in the charged and discharged state.

FIG. 1 shows, in a rough form, the functioning of an ROB insofar as necessary for the following description of the invention. A typical configuration with an ROB consists therein that a process gas, in particular air, is blown in at a positive electrode 20 via an air inlet device 36 and oxygen is extracted from the air, passing in the form of oxygen ions through a solid state electrolyte 22 to a negative electrode 26. There, depending on the operating state, the oxygen is discharged, charged, oxidized or reduced. If a solid layer of the material to be oxidized or reduced were present at the negative electrode—often iron is used—then the charging capacity of the battery would rapidly be exhausted. For this reason, it is suitable to use a porous element 2 at the negative electrode as the energy storage medium, said porous element containing the functional oxidizable material, that is, in a suitable form, the iron.

By means of a redox pair which, in the operating state of the battery is gaseous, for example $H_2/H_2O$, the oxygen is transported through pore channels of the porous element to the oxidizable material, that is, the metal which is present in the porous element in the form of a metal-ceramic composite material. Depending on whether a charging or a discharging process is underway, the metal or metal oxide is oxidized or reduced and the oxygen required therefor is supplied by means of the gaseous redox pair $H_2/H_2O$ or is transported back to the solid state electrolyte (by a shuttle mechanism).

The advantage of iron as the oxidizable material is that, in the oxidization process thereof, iron has roughly the same open circuit voltage, of approximately 1 V, as the redox pair $H_2/H_2O$.

It is an object of the invention to configure the porous element such that said element is as mechanically stable as possible and remains mechanically stable even after a large number of charging and discharging cycles, which also entail the oxidation and/or reduction of the energy storage medium.

Figure 2:
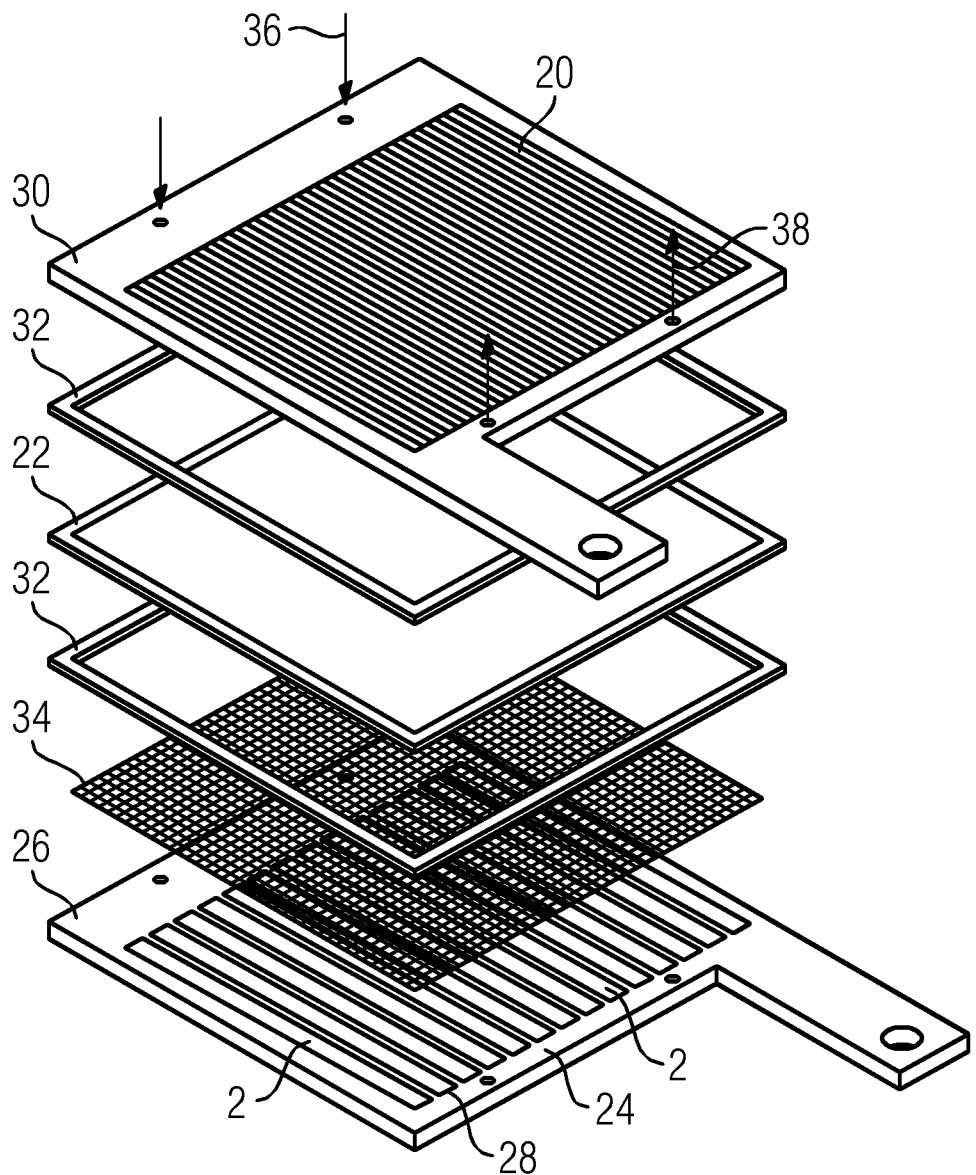
FIG. 2 is an exploded representation of the layered structure of a cell for an ROB.

FIG. 2 shows a more detailed structure of a cell, an ROB, in the form of an exploded drawing. The arrangement of the electrodes is shown in the reverse order in FIG. 2 as compared with FIG. 1 and the positive electrode 20 is here shown above in the form of a base plate 30 for the positive electrode 20. In this embodiment, the ROB has the feed device 36 and the outlet device 38 for the process gas, in particular, air. Fundamentally, however, an ROB can also be operated in the closed state of the positive electrode, although this operation is not described in detail in this example. Arranged on the base plate 30 of the positive electrode 20 is a glass frame on which, in turn, the solid state electrolyte 22 is arranged, followed by a further glass frame 32 and a contact grid 34 which is made, for example, of nickel. Finally, a base plate 24 of the negative electrode 26 is provided, the base plate 24 having depressions 28 in which the porous element 2 is embedded and represents the energy storage medium of the cell 24 of the ROB.

Figure 3:
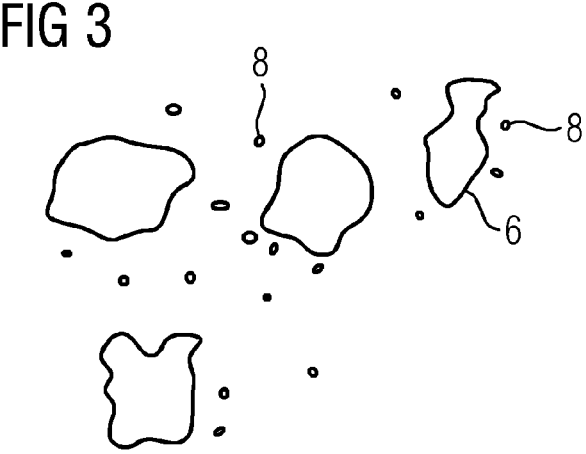
FIG. 3 is a schematic representation of a mixture of the metal matrix and of the ceramic portion.
Figure 4:
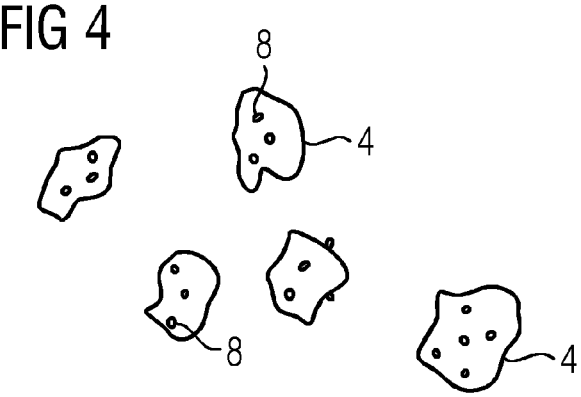
FIG. 4 is the mixture of FIG. 3 following mechanical alloying such that the metal-ceramic composite material is formed.

In order to produce the porous element 2, a suitable method is used which will be described by reference to FIGS. 3 to 8. FIG. 3 shows a mixture which comprises, firstly, a metal matrix 6, the metallic particles of the metal matrix 6 being iron particles. Secondly, said mixture comprises a ceramic portion 8 wherein a possible grain size distribution of the particles of the ceramic portion 8 preferably lies in the range of 10 nm to 100 nm. The particles of the metal matrix 6 lie preferably in the size range from 1 μm to 50 μm. The mixture is now placed in a device by means of which the metal particles 6 and the ceramic portion 8 is mechanically alloyed. Particularly suitable for this purpose is an attritor in which, for example, ceramic spheres split and knead the powder by mechanical action so often that the ceramic portion 8 is kneaded and embedded into the metal matrix particles 6. The result is an ODS material which can also be made by other means, although the method using mechanical alloying has proved to be useful.

Figure 5:
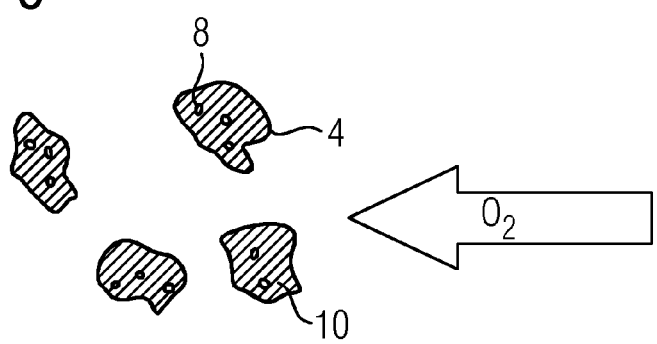
FIG. 5 is the oxidized metal-ceramic composite material.

In a subsequent method step as illustrated in FIG. 5, the metal-ceramic composite material 4 thus obtained is oxidized and the metal-ceramic composite material 4 then exists in an oxidized form. The oxidizing process has the significance, inter alia, that the metal-ceramic composite material is now more brittle and can be ground using a grinding process, not disclosed here, to a suitable grain size distribution. In particular, the grain size distribution in the range from 1 μm to 50 μm has proved to be suitable for further use of the metal-ceramic composite material. This size distribution can possibly be achieved by means of specific sieving processes following the grinding process.

Figure 6:
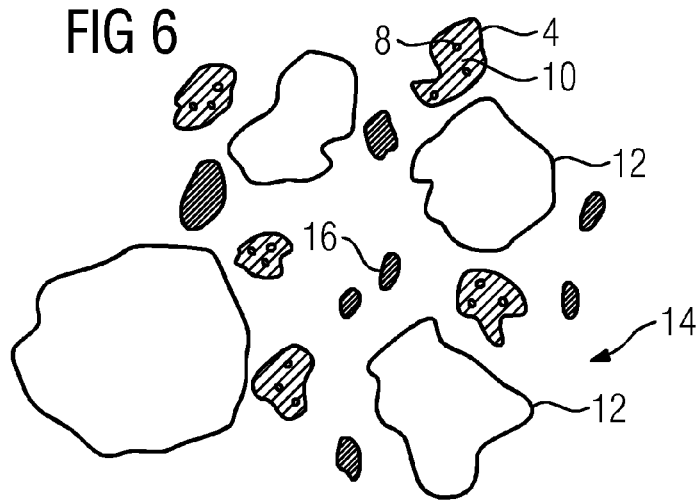
FIG. 6 is the metal-ceramic composite material in an oxidized form mixed with ceramic supporting particles.

The powder of metal-ceramic composite material 4 in oxidized form obtained in this way is mixed with a further ceramic powder, said powder consisting of ceramic supporting particles 12. FIG. 6 shows schematically a comparison of the sizes of the particles of the metal-ceramic composite material 4, which usually lies in the range of 1 μm to 50 μm, and the ceramic supporting particles 12. The ceramic supporting particles, in particular, have a particle size distribution in the range of 10 μm to 100 μm. All the values given cover wide ranges and, depending on the pore structure and absolute particle size desired, with simple sieving techniques, narrower particle size distributions can also be achieved for all the components described.

Figure 7:
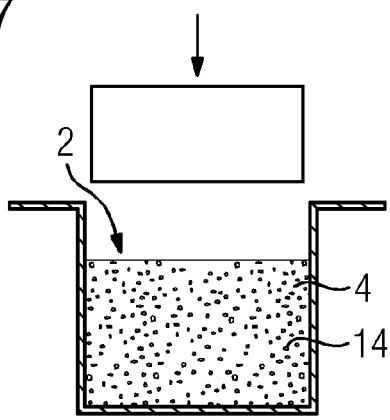
FIG. 7 is a schematic representation of the pressing process for pressing the porous element.
Figure 8:
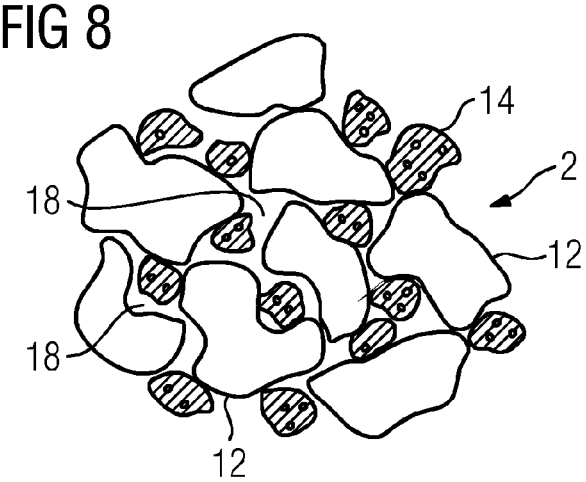
FIG. 8 is a schematic representation of the microstructure of the porous element.

It can also be useful, in principle, to add filler materials 16 which are possibly burned out during the shaping of the porous element 2 and which ensure better porosity. Subsequently, as shown in FIG. 7, shaping of the metal-ceramic/ceramic mixture 14 of FIG. 6 into the porous element 2 takes place. For the shaping process, uniaxial pressing processes, cold isostatic pressing processes (CIP) or hot isostatic pressing processes (HIP) in particular are suitable. It may also be suitable to subject the pressed porous elements to a pre-sintering process at approximately 800° C., so that the ceramic supporting particles 12 form first sinter necks between one another, such that the strength of the porous element is increased. As described by reference to FIG. 2, the porous element 2 is now placed in depressions 28 of the base plate 24 of the negative electrode 26 and serves there as an energy storage medium.

The invention claimed is:

1. A method for producing a porous element, comprising:
producing a powdered metal-ceramic composite material comprising a metal matrix and a ceramic portion;
at least partially oxidizing the metal matrix to a metal oxide;
grinding the metal-ceramic composite material;
mixing the ground metal-ceramic composite material with powdered ceramic supporting particles into a metal-ceramic/ceramic mixture; and
shaping the metal-ceramic/ceramic mixture into the porous element,
wherein particles of the metal-ceramic composite material are supported by the ceramic supporting particles in such a way that the particles of the metal-ceramic composite material do not lie on one another, and
wherein a uniform porosity of the porous element is maintained by the ceramic supporting particles to prevent sintering and melting of the particles of the metal-ceramic composite material.

2. The method as claimed in claim 1, wherein the metal matrix comprises iron or an iron alloy.

3. The method as claimed in claim 1, wherein a doped zirconium oxide ceramic is used as the ceramic portion of the metal-ceramic composite material, and wherein the doped zirconium oxide ceramic is doped with yttrium or scandium.

4. The method as claimed in claim 1, wherein the metal matrix and the ceramic portion are mixed in powdered form and are alloyed with one another through application of mechanical energy.

5. The method as claimed in claim 1, wherein the ceramic supporting particles which are mixed with the metal-ceramic composite material comprise a larger mean particle size than particles of the metal-ceramic composite material.

6. The method as claimed in claim 1, wherein a filler material is added to the metal-ceramic/ceramic mixture for later formation of pores.

7. The method as claimed in claim 1, wherein at least 80% of particles of the ceramic portion in the metal-ceramic composite element comprise a size in a range of 10 nm to 50 nm, or in a range of 20 nm to 200 nm, or in a range of 20 nm to 500 nm.

8. The method as claimed in claim 1, wherein at least 80% of the particles of the metal-ceramic composite material comprise a size in a range of 1 μm to 50 μm.

9. The method as claimed in claim 1, wherein at least 80% of particles of the ceramic supporting particles comprise a size in a range of 10 μm to 100 μm.

* * * * *